INVENTOR,
Robert E. Boyden
BY
Fred N. Schwend
ATTORNEY.

Aug. 17, 1965 R. E. BOYDEN 3,201,525

MULTI-CHANNEL SOUND RECORDING AND REPRODUCING DEVICE

Filed June 30, 1960 4 Sheets-Sheet 2

INVENTOR,
Robert E. Boyden
BY [signature]
ATTORNEY.

MULTI-CHANNEL SOUND RECORDING AND REPRODUCING DEVICE

Filed June 30, 1960 4 Sheets-Sheet 3

INVENTOR,
Robert E. Boyden
BY [signature]
ATTORNEY.

MULTI-CHANNEL SOUND RECORDING AND REPRODUCING DEVICE

Filed June 30, 1960 4 Sheets-Sheet 4

INVENTOR,
Robert E. Boyden
BY
ATTORNEY.

United States Patent Office 3,201,525 Patented Aug. 17, 1965

3,201,525
MULTI-CHANNEL SOUND RECORDING AND REPRODUCING DEVICE

Robert E. Boyden, 5608 Sultana, Temple City, Calif.
Filed June 30, 1960, Ser. No. 39,903
3 Claims. (Cl. 179—100.2)

This invention relates to sound recording and reproducing devices of the magnetic tape or belt type and has particular reference to sound recorders and reproducers of the "juke box" type wherein a plurality of recordings, such as songs, are recorded in different channels or tracks on an endless belt having a magnetic recording layer thereon.

Heretofore, attempts have been made to produce sound recording and reproducing devices of the above nature, but difficulty has been encountered in properly selecting different channels as well as the beginnings of the recordings in the different channels. This is partially due to the fact that such channels are not visible to the eye, nor are the beginnings of the recordings discernible.

The above problem is accentuated in cases where the magnetic belt is replaced from time to time by another belt or where the belt is removed from the machine and sent to a recording station to replace selected recordings, as, for example, songs which may have become outmoded and which are to be replaced by new recordings.

A further problem encountered in devices of the above type is that of handling the magnetic tape or belt in removing it for replacement or for re-recording.

Although magazines or cartridges have previously been proposed to contain the belt and thus eliminate the necessity of handling the same, the use of such magazines or cartridges has further accentuated the problem of locating specific recordings and the starting points of such recordings.

It therefore becomes a principal object of the present invention to provide a sound recording and reproducing device of the above type for a plurality of different recordings with means for readily selecting different ones of such recordings for reproduction.

Another object is to provide a sound recording and reproducing device incorporating a magnetic belt contained in an enclosed magazine with means for readily selecting different recordings and the starting points of such recordings.

A further object is to facilitate removal and replacement of a magnetic belt for a device of the above type without losing different recordings thereon or their starting positions on the belt.

A still further object is to facilitate re-recording of selected channels on a magnetic belt for a device of the above type without interfering with recordings in other channels.

A still further object is to provide a recording and reproducing device of the above type with means for causing automatic advancement from one channel or recording to another.

A still further object is to provide a recording and reproducing device of the above type which may contain a large number of channels and which is simple and economical to manufacture.

The manner in which the above and other objects of the invention are accomplished will be readily understood on reference to the following specification when read in conjunction with the accompanying drawings, wherein.

Figure 5:
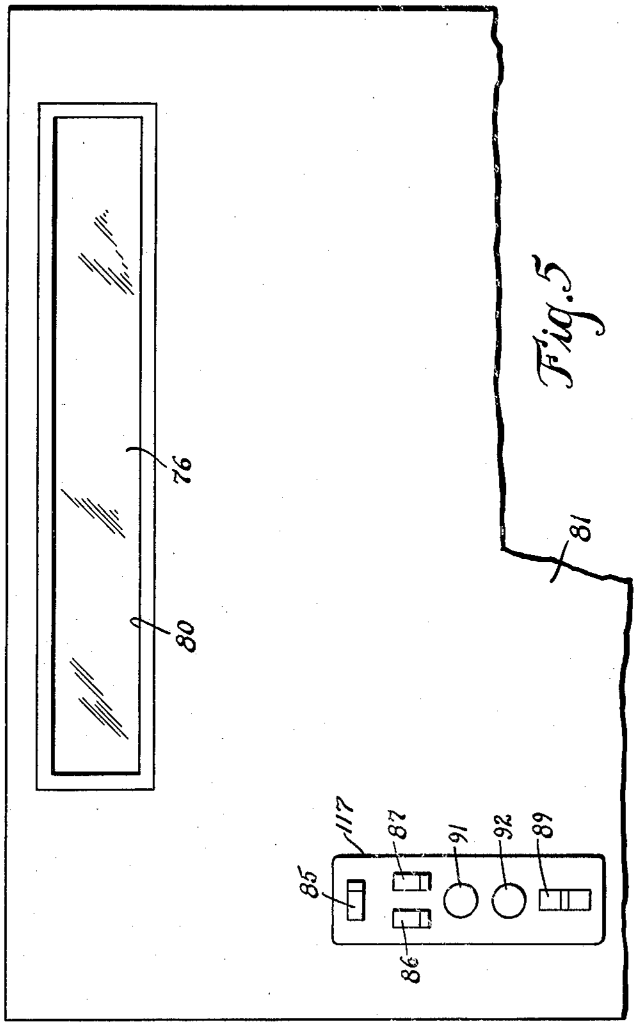
FIG. 5 is a view taken along the line 5—5 of FIG. 3 illustrating the control panel and the channel indicating dial window.

Referring to the drawings, the recording and reproducing device of the present invention comprises, in general, a magazine unit, generally indicated at 11, containing an endless magnetic belt 12 fed by a sprocket drum 13 past a pair of juxtaposed read-record-erase heads 14 and 15 (FIG. 2), a head transport 16, a motor 17 (FIG. 1), and drive means for both shifting the head transport to different channel positions and for advancing the belt lengthwise through a recording or reproducing cycle. A control panel, generally indicated at 117 (FIGS. 3, 5 and 6) is also carried by the magazine unit.

The magazine unit is removably mounted in a cabinet, generally indicated at 20 which contains certain electrical equipment associated with the recording and reproducing device such as a loud speaker 21, amplifier circuits 22 and erase, read and record circuits 23, all well known in the art. The heads 14 and 15 and various switches embodied in the magazine unit are electrically connected to correlated elements such as the amplifier 22 and erase, read and record circuits 23 through a connector, generally indicated at 24 (FIG. 2) comprising a a multi-prong plug 25 insertable in a mating socket 26 which is secured to a side plate 27 forming part of the framework of the magazine unit.

In detail, the magazine unit comprises a frame consisting of a second side plate 28 held in spaced relation with plate 27 through a top cross brace 30. The plates 27 and 28 are secured at their lower ends to a box-like container 31 which includes a bottom wall 32.

The aforementioned belt sprocket drum 13 has two rows of sprocket teeth 33 along adjacent opposite ends thereof and is suitably secured to a support shaft 34 rotatably mounted in bearings formed in the side plates 27 and 28.

The endless belt 12 has perforations therealong engaged by the sprocket teeth 33 and is draped in a sinuous manner upon itself in the container 31. The belt rests on a curved section 35 of a guide wall 36 which extends upwardly adjacent the rear wall of the container 31 and terminates adjacent the drum 13. A second guide wall 37 is spaced from the upper end of wall 36 and is effective to guide the belt onto the drum 13. A guide wall 38 and curved stripper plate 40 guide the belt off of the drum. These guide walls are attached at their ends to the side plates 27 and 28.

A notched disc 41 and a wheel 42 (FIGS. 2 and 3) are suitably keyed on the drum shaft 34, the wheel 42 extending adjacent the smaller diameter element of a compound wheel 43 which is rotatably mounted on a stub shaft 43*a* extending from the side plate 27.

The large diameter element of the compound wheel 43 is maintained in constant frictional engagement with a drive roller 44 carried by the shaft of the motor 17. In order to effect proper frictional driving of the compound wheel 43 and wheels entrained therewith, the peripheries of both the large and small diameter elements of such wheel are preferably rubber covered.

An idler roller 46 is rotatably carried on an arm 47 pivotally supported at 48. The arm is normally held in its illustrated position by a tension spring 50 wherein a roller 51 thereon fits within a notch formed in the disc 41. In such position, the roller 46 is out of driving engagement with the wheel 42 which is also preferably rubber covered. The arm is connected to the armature 52 of a solenoid 53 attached to the side plate 27.

The transducer heads 14 and 15 are mounted on arms 54 pivotally supported at 55 on the head transport 16 so as to rest on the surface of the belt 12 by gravity. The transport is slideable on a cross shaft 56 which is secured at its opposite ends to the side plates 27 and 28.

Figures 1, 4, 4A:
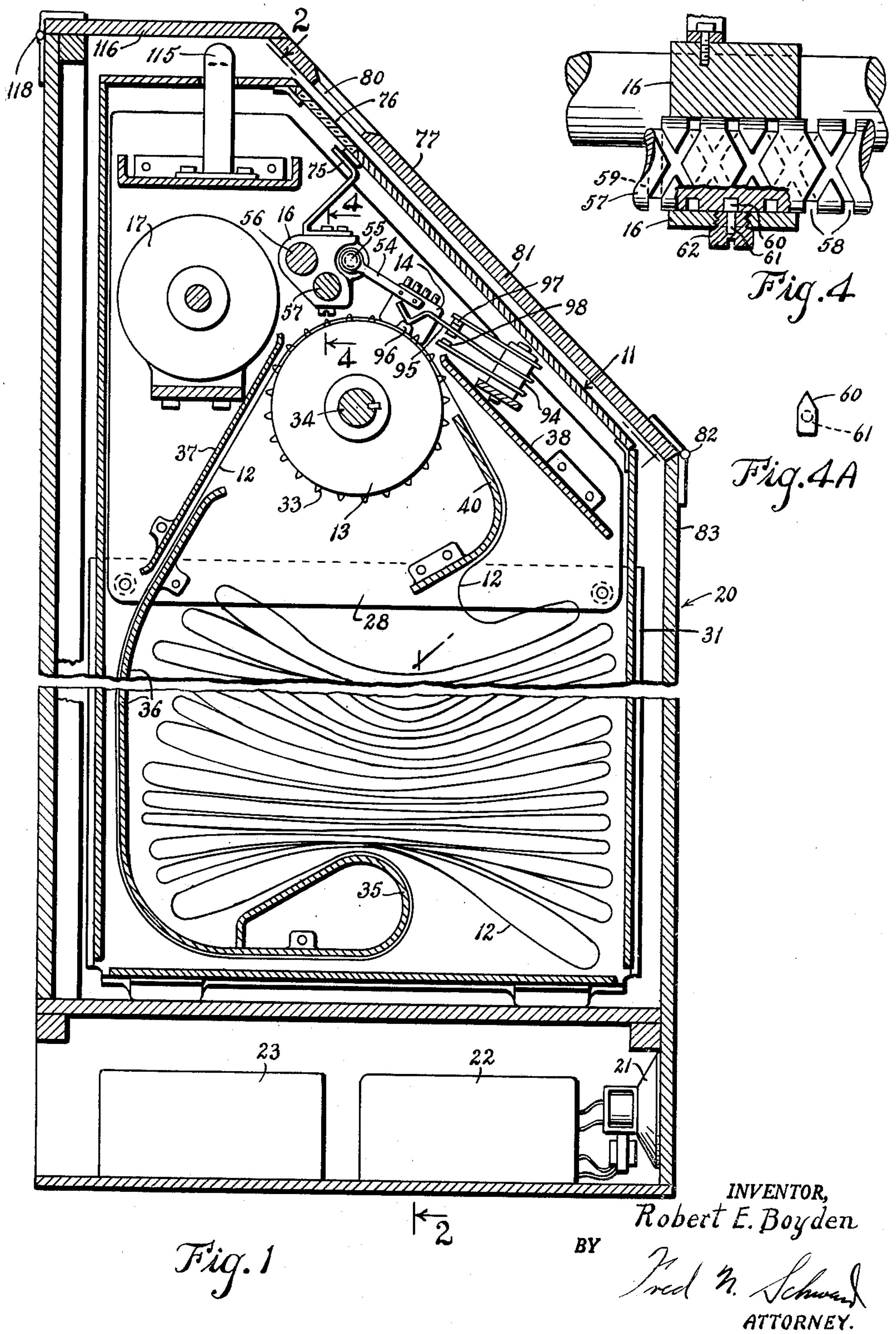
FIG. 1 is a sectional side view taken through a recording and reproducing device embodying a preferred form of the invention and is taken substantially along the line 1—1 of FIG. 2.
FIG. 4 is a fragmentary sectional view taken along the line 4—4 of FIG. 1 and illustrating the head transport and the screw shaft for advancing the same.
FIG. 4A is a detail view illustrating the shape of the groove follower or runner of FIG. 4.
Figure 2:
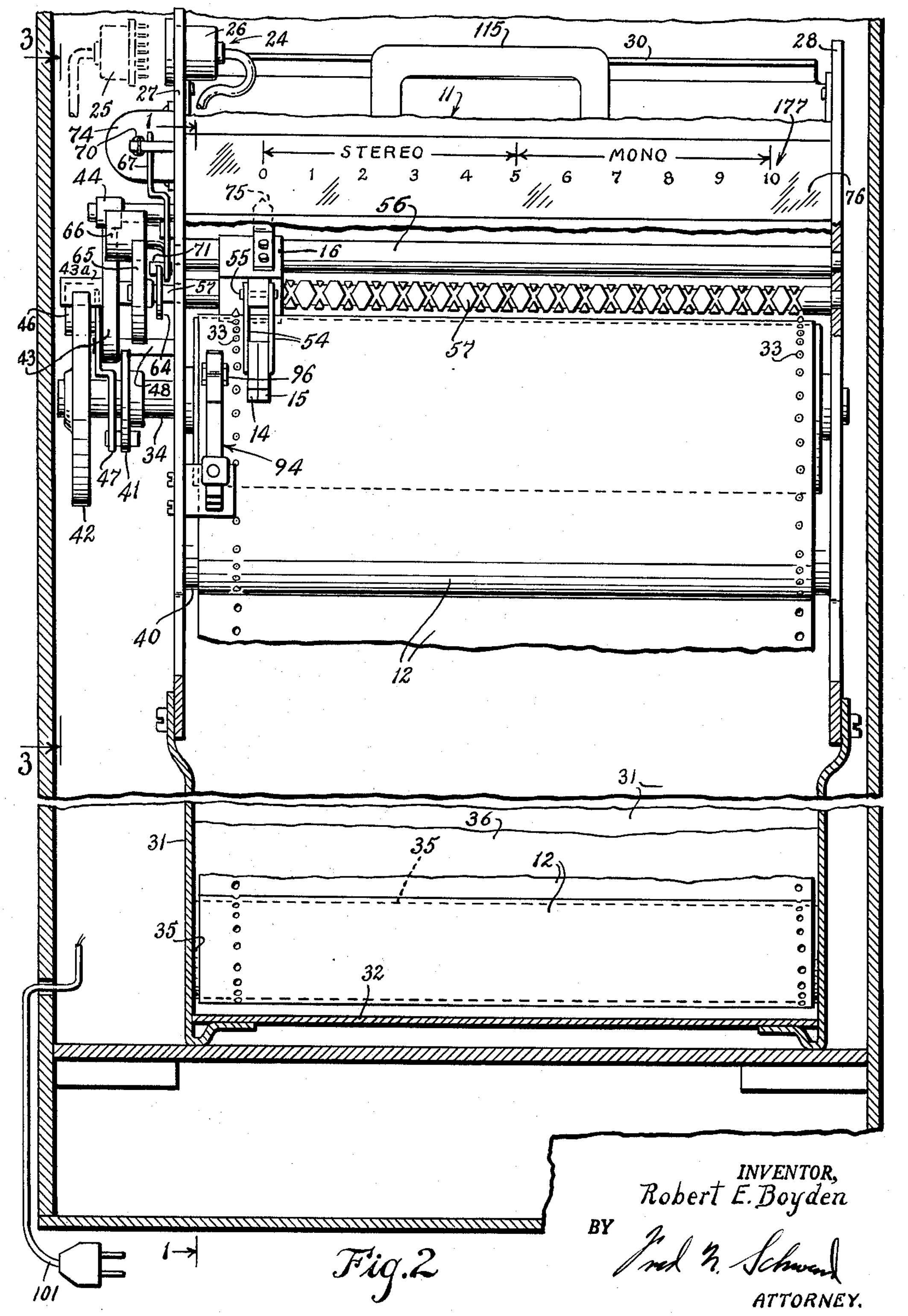
FIG. 2 is a sectional front view taken substantially along the line 2—2 of FIG. 1.

For the purpose of advancing the heads 14 and 15 laterally along the shaft 16 into cooperative association with a number of laterally spaced channels on the belt 12, a screw shaft 57 is rotatably mounted in bearings formed in the side plates 27 and 28 and has two oppositely cut helical grooves 58 (FIG. 4) therein. The shaft 57 passes through a hole extending through the transport and is engaged by a runner 60 (see also FIG. 4A), the latter having a shank 61 pivotally mounted in a bearing element 62 threadably attached to the transport 16. The head of the runner 60 is shaped as illustrated in FIG. 4 so that it will follow along one groove 58 from one end to the other. The opposite ends of the two grooves come together as indicated at 59 so that as the transport reaches one end of its travel, the runner 61 will be deflected into the second groove whereby continued rotation of the shaft 57 will cause the transport to advance in the reverse direction toward the opposite end of its travel. It should also be noted that the pitch of the grooves 58 is such that one-half revolution of the shaft 57 will advance the head transport from one channel to the next.

A notched disc 64 and a rubber covered wheel 65 are attached to the screw shaft 57. The wheel 65 is adapted to be frictionally engaged by an idler wheel 66 carried by an arm 67 fulcrumed at 68 and normally held in its clockwise illustrated position by a tension spring 70 to maintain a roller 71 on the arm in engagement with one of two diametrically opposed notches 72 in the disc 64. The arm 67 is connected to the armature 73 of a solenoid 74 attached to the side frame 27.

When the solenoid 74 is energized, the arm 67 is swung counterclockwise to frictionally engage the roller 66 with the wheel 65 and with the large diameter element of wheel 43, thereby entraining the screw shaft 57 with the motor. At the same time, the roller 71 will be withdrawn from one of the notches 72, permitting rotation of the shaft by idler 66, etc.

The motor is energized concurrently with energization of the solenoid 74, as will be described presently, and accordingly, the periphery of the disc 64 will pass under the roller 71, thereby holding the same in position to maintain the roller 66 in driving engagement with the wheel 65 until the dyiametrically opposite notch 72 passes under the roller. This will occur when the transport 16 has advanced along the screw shaft 57 from one channel to the next. At such time, providing the solenoid 74 has been deenergized, the roller 71 will drop into such notch, thereby disconnecting the screw shaft from the motor drive and locking the shaft 57 in place.

Figure 7:
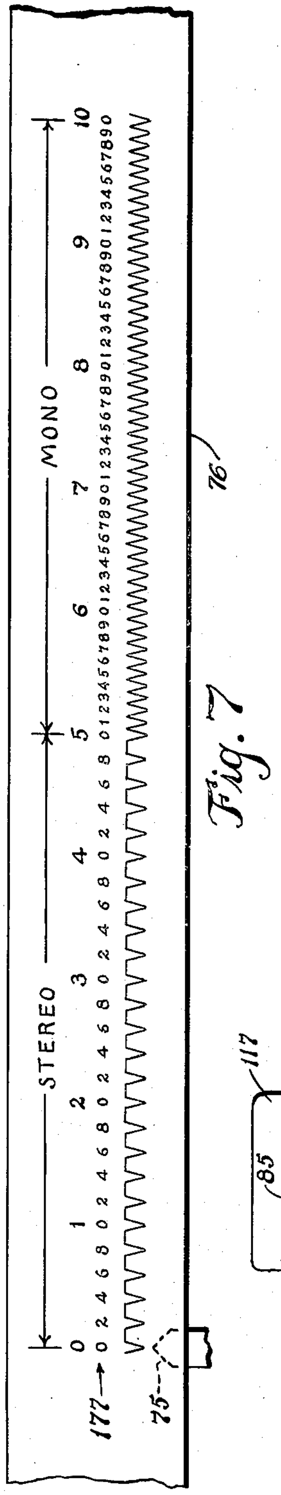
FIG. 7 is an enlarged view of the channel indicating dial.

In order to indicate the particular channel with which the transport 16 has been aligned at any particular time, a pointer 75 is mounted on the transport and extends below a transparent dial window 76 (see also FIGS. 5 and 7) mounted in an opening formed in a cover 77 enclosing the magazine unit 11. The window 76 has inscribed therein indicia 177 indicating by number the different channels.

It will be noted that the dial is divided into two sections titled Stereo and Mono. The Stereo section has two side-by-side tracks for each channel and is intended to have recorded thereon a stereo recording which may be read or recorded by use of both heads 14 and 15. On the other hand, the Mono section has one sound track for each channel and is intended to have recorded thereon a mono recording which is intended to cooperate with the head 14 only. However, a mono recording may be made or read in the Stereo section by using the head 14 only as will appear later. Also, if desired, a Stero recording may be made on the Mono section by the use of both heads.

The dial 76 is viewed through an opening 80 cut in an inclined door 81 which is hinged at 82 to the front wall 83 of the cabinet.

The control panel 117 projects through a second opening 84 in the door 81 and carries various switches for controlling operation of the apparatus.

Figures 3, 8, 9:
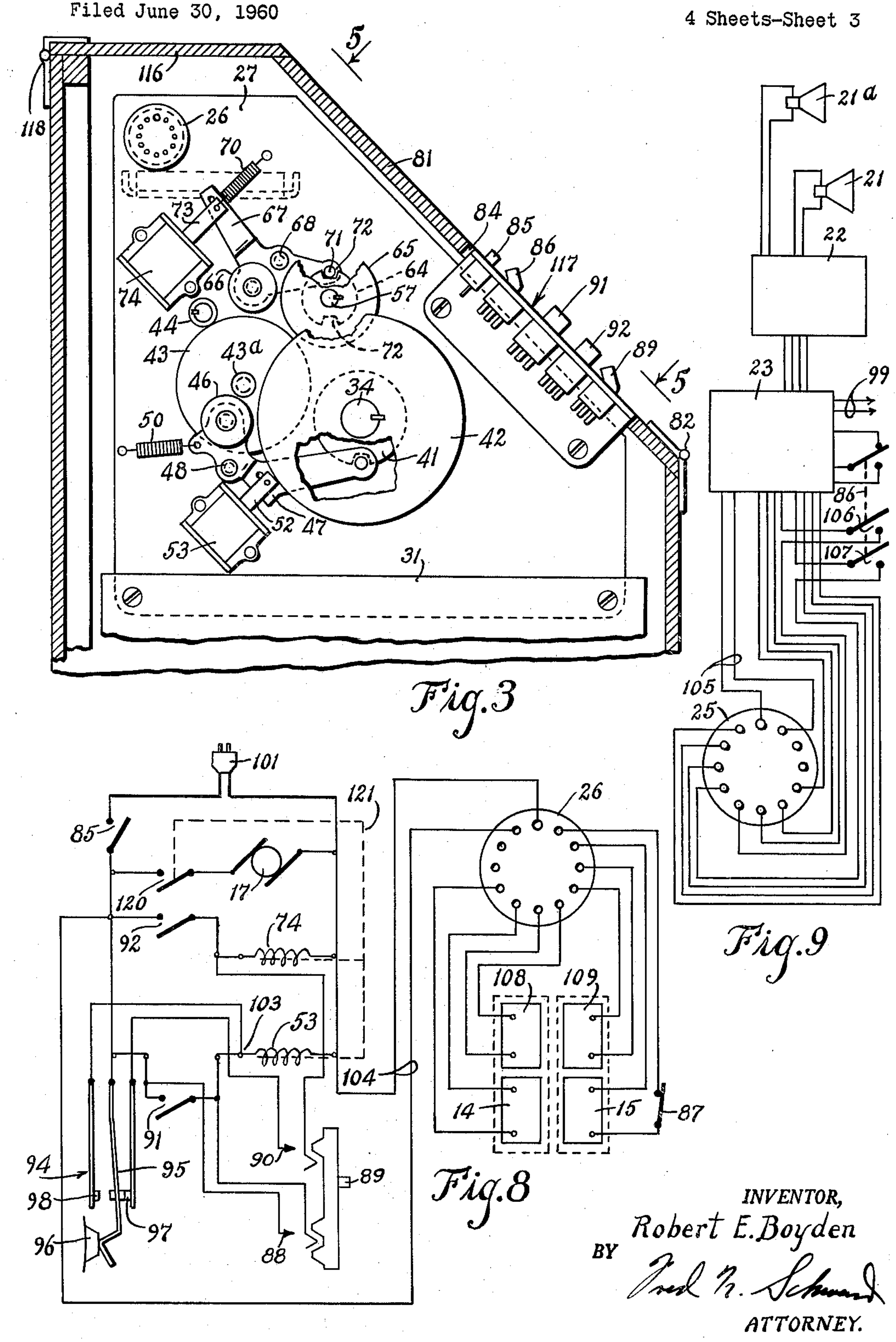
FIG. 3 is a sectional view taken along line 3—3 of FIG. 2, illustrating particularly the drive means and its controls.
FIG. 8 is a schematic view of the wiring circuit contained in the magazine unit.
FIG. 9 is a schematic view of the wiring circuit contained in the cabinet.
Figure 6:
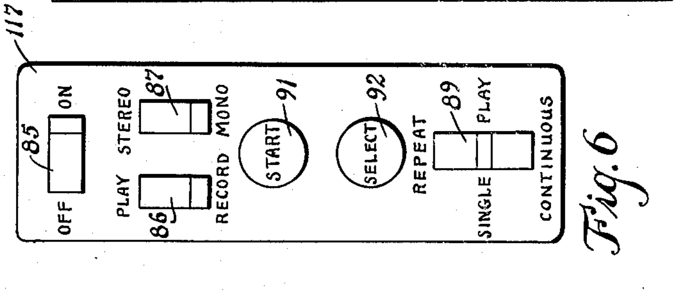
FIG. 6 is an enlarged front view of the control panel.

Referring in particular to FIGS. 6 and 8, the control panel 117 includes a settable on-off switch 85, a settable Play-record switch 86, a settable Stereo-Mono switch 87, a settable Repeat switch 88, a settable Continuous switch 90, a push button Start switch 91 and a push button Select switch 92. A common control knob 89 is provided which when located in its neutral illustrated position holds switches 88 and 90 open. When the knob is moved upwards, it closes switch 88, but when it is moved downward, it closes both switches 88 and 90.

An additional Class C switch 94 (FIGS. 1 and 8) is mounted on the side plate 27 and comprises a flexible switch blade 95 electrically connected to the on-off switch 85. The free end of the switch blade is engageable with a cam 96 attached to the belt 12 in such position that when the belt is in its home or start position representing the beginning of a recording on each of the channels, the cam will engage the switch blade to hold the latter in engagement with a contact 97 electrically connected to one of the contacts of the switch 90. When the belt is moved out of home position, the cam 96 moves out from under the switch blade 95, allowing the latter to engage a second contact 98 electrically connected to one end of the winding of the belt solenoid 53.

Assuming that it is desired to reproduce a stereo recording and that the transport 16 is properly positioned on the selected channel, the switch 85 is closed, the switch 86 is set to "play" position, as indicated in FIG. 9, the switch 87 is set to "stereo," as indicated in FIG. 8, and the start key 91 is momentarily depressed. Accordingly, a circuit will be established from a source of current 101, through switch 85, switch 91 and the belt control solenoid 53, thereby causing the solenoid to rock the arm 47 clockwise to move the roller 46 into driving engagement with the small diameter element of the compound wheel 43 and with the wheel 42 so as to rotate the drum 13 and advance the belt past the heads 14 and 15. At this time, the power circuit is established through lines 104, plug connectors 26 and 25 (see also FIG. 9), and lines 105 to the circuitry 23. Since the switch 86 is set to "play," the circuit 23 and amplifier 22 will accordingly drive the loudspeakers 21 and 21*a* under the influence of heads 14 and 15. Also, the armature of solenoid 53, operating through a suitable mechanical connection diagrammatically indicated at 121 (FIG. 8), closes a switch located in the energizing circuit for motor 17.

As the belt advances, the cam lobe 96 passes from under the switch blade 95 to establish the power circuit through the blade 95, contact 98, point 103 and the belt solenoid 53. Accordingly, the belt will continue to be driven through a complete cycle until the cam lobe 96 again engages the switch blade 95 to break the power circuit.

In the event that is is desired to reproduce a single or mono recording, the switch 87 may be opened so that the head 14 only will be effective to reproduce, even though the transport is located over a channel in the "stereo" section.

In the event that it is desired to record a song or the like while the magazine unit is in the cabinet, a suitable microphone and amplifier circuit (not shown) is connected through lines 99 to the circuitry 23. The switch 86 is set to "record," thereby to condition either the head 14 or both heads 14 and 15, depending upon the setting of switch 87, to record. Contacts 106 and 107 of the switch 86 are now closed to energize erase magnets 108 and 109, respectively, incorporated with the heads 14 and 15 to erase the preceding recording in advance of the new recording.

When it is desired to select a new channel for recording or reproducing, the select switch 92 is closed. Accordingly, a circuit will be completed through the switch 92 to the solenoid 74. The latter will rock the arm 67 counterclockwise. The armature 73 of solenoid 74 will operate through the mechanical connection 121 to close the switch 120 and thus energize the motor. As the arm 67 rocks counterclockwise it will cause the idler wheel 66 to move into driving engagement with the larger diameter element of the compound wheel 43 and with the wheel 65 to rotate the screw shaft 57. The latter will rotate to advance the transport 16 past one or more channels until the select switch 92 is released to its normal condition. At this time, if the roller 71 (FIG. 3) is not aligned with one of the notches 72, the momentum of the motor armature will continue to drive the entrained parts including notched disc 64 until the next notch 72 passes under the roller at which time the spring 70 becomes effective to rock the arm 67 clockwise, thereby causing the roller 71 to detent the shaft 57 and causing the roller 66 to break the drive connection from the motor.

In the event that it is desired to automatically repeat reproduction of the same recording any number of times, the repeat switch 88 is set in closed position causing continued repeat operation.

In the event it is desired to cause an automatic advancement from one channel to the next after reproducing such first channel, the knob 89 is moved downward to its continuous setting to close both switch 88 and 90. After the belt completes its first cycle, the switch blade 95 is moved to complete a circuit through switch 90 and the transport control solenoid 74 to energize the latter and thereby entrain the screw shaft 57 with the motor. At this time the switch 120 will close to drive the motor to advance the transport to the next channel. The motor will also advance the cam lobe 96 beyond the switch blade 95 so that the latter will engage the contact 98, reinitiating the reproducing cycle in that channel. This recycling and advancement of the transport to the next succeeding channel will continue as long as the switches 88 and 90 are closed. As the transport reaches one end of its travel, it will automatically step toward the opposite end as described before.

As previously noted, the magazine unit 11 may be bodily removed from the cabinet 20 for replacement or re-recording of one of more of the channels on the belt, and for this purpose, a handle 115 (FIG. 1) is secured to the upper cross brace 30 and extends through an opening in the enclosure 76.

In removing the magazine unit, the plug 25 (FIG. 2) is disconnected, a top cabinet door 116 is swung up about its hinge support 118 and the aforementioned door 81 is swung forwardly about its hinges 82, permitting the magazine unit to be removed and subsequently replaced or a new magazine unit may be installed in its place.

Having thus described the invention, what I desire to secure by United States Letters Patent is:

1. A sound transducing device comprising an endless magnetic belt, a rotatable drum for advancing said belt, means including an electric motor for rotating said drum; an electromagnetic means for entraining said drum with said motor, a transducing head cooperable with said belt, a power circuit for said motor and said electromagnetic means including a switching device effective in a first position to maintain said power circuit completed; a cam lobe on said belt, means comprising said cam lobe for normally holding said switching device in a second position wherein said power circuit is incomplete and for moving said switching device to said second position after said belt completes a cycle of operation, means other than said switching device for momentarily completing said power circuit whereby to energize said motor to move said cam lobe from cooperative relation with said switching device, a second selectively settable switching device, and means including said first switching device when in said second position thereof and said second switching device when set to energize said electromagnetic means whereby the momentum of said motor developed during the cycle of operation of said belt is effective to advance said cam lobe past said first switching means to initiate a second cycle of operation of said belt.

2. A sound transducing device comprising an endless magnetic belt having a plurality of channels in side-by-side relation, a rotatable drum for advancing said belt, means including an electric motor for rotating said drum; a transducing head cooperable with said belt, a power circuit for said motor including a switching device effective in a first position to maintain said power circuit completed; means on said belt for normally maintaining said switching device in a second position wherein said power circuit is incomplete and for moving said switching device to said second position after said belt completes a cycle of operation, means other than said switching device for momentarily completing said power circuit whereby to energize said motor to move said maintaining means from cooperative relation with said switching device, means including an electromagnetic device for advancing said head from one of said channels to another, a second selectably settable switching device, and means including said first switching device when in said second position and said second switching device when set to energize said electromagnetic means whereby to advance said head from one of said channels to another upon completion of a cycle of said belt.

3. A sound transducing device comprising an endless magnetic belt, a rotatable drum for advancing said belt, means including an electric motor for rotating said drum, electromagnetic means for entraining said drum with said motor, a transducing head cooperable with said belt, a power circuit for said motor and said electromagnetic means including a switching device effective in a first position to maintain said power circuit completed; switch control means for normally holding said switching device in a second position wherein said power circuit is incomplete and for moving said switching device to said second position after said belt completes a cycle of operation, means other than said switching device for momentarily completing said power circuit whereby to energize said motor to move said switch control means from cooperative relation with said switching device, a second selectively settable switching device, and means including said first switching device when in said second position thereof and said second switching device when set to energize said electromagnetic means whereby the momentum of said motor developed during the cycle of operation of said belt is effective to advance said switch control means past said first switching means to initiate a second cycle of operation of said belt.

(References on following page)

References Cited by the Examiner

UNITED STATES PATENTS

| | | | |
|---|---|---|---|
| 2,109,627 | 3/38 | Finch. | |
| 2,328,539 | 9/43 | Greenleaf | 179—100.2 |
| 2,499,700 | 3/50 | Tinkham | 179—100.2 |
| 2,702,833 | 2/55 | Camras | 179—100.2 |
| 2,821,576 | 1/58 | Gaubert | 179—100.2 |
| 2,908,767 | 10/59 | Fritzinger | 179—100.2 |
| 2,974,960 | 3/61 | Hyatt | 179—100.2 |
| 3,024,319 | 3/62 | Roberts et al. | 179—100.2 |

IRVING L. SRAGOW, *Primary Examiner.*

NEWTON N. LOVEWELL, *Examiner.*